United States Patent [19]

Monk

[11] 4,267,441
[45] May 12, 1981

[54] ENERGY RAYS TRACKING DEVICE

[76] Inventor: Robert J. Monk, 4640 Country Creek Apt. 1255, Dallas, Tex. 75236

[21] Appl. No.: 921,198

[22] Filed: Jul. 3, 1978

[51] Int. Cl.³ .................................................. G01J 1/20
[52] U.S. Cl. ................................. 250/203 R; 126/425
[58] Field of Search ................ 250/201, 203; 356/141, 356/152; 126/270, 271, 424, 425

[56] References Cited

U.S. PATENT DOCUMENTS

| 4,107,521 | 8/1978 | Winders | 250/203 R |
| 4,146,784 | 3/1979 | Yekutieli | 250/203 R |
| 4,146,785 | 3/1979 | Neale | 250/203 R |

*Primary Examiner*—David C. Nelms
*Assistant Examiner*—Edward P. Westin

[57] ABSTRACT

An energy rays tracking device including a receiver for fixing a position relative to the direction of maximum energy rays, a prime mover for maintaining the alignment of the receiver and an energy rays user, an energy rays tracker for controlling the power to the prime mover in response to the receiver, a timed tracker for controlling the prime mover when the energy rays tracker is not functioning due to energy rays being too diffused, an energy sensitive element for detecting the presence or absence of energy rays, and a power controller responsive to the energy sensitive element for repositioning the receiver and the energy rays user for the following period of tracking is disclosed. The receiver includes an enclosure which only allows a selected pattern of direct rays to penetrate into the enclosure. A razor sharp edge at the opening of the enclosure maintains the outermost direct energy rays undiffused. A differential sensor sensitive to direct energy rays is installed inside the enclosure for determining the direction of the direct energy rays. In an application for tracking the sun, the time tracker uses a piecewise linear method of tracking. In the return cycle during the night, the return is interspersed with a wash cycle for cleaning the energy rays user.

12 Claims, 12 Drawing Figures

Elevation Energy Rays Tracking

Power Control Means

ENERGY RAYS TRACKING DEVICE

CROSS-REFERENCE TO RELATED APPLICATIONS

1. Disclosure Document Program under subject: Sun Tracking Device for use with concentrating Solar Energy Collectors. Assigned Disclosure Document No. 867,507 on Jan. 11, 1973 by the Patent and Trademark Office.
2. Solar Energy Collectors, whose positions are to be controlled by an Energy Rays Tracking Device, are the subject of separate patent application Ser. No. 864,617 filed Dec. 27, 1977 in the Patent and Trademark Office which has become U.S. Pat. No. 4,161,942.

BACKGROUND

Because of shortages of fossil fuels and the hazards of nuclear fuels, solar energy has become a desirable source of fuel. With the advent of more efficient and economical concentrating type energy rays collectors an economical and completely automatic energy rays tracking device will be needed to enable accurate positioning of energy rays collectors for maximum energy collection, to reposition the energy rays collectors for the following period of collection and to clean the concentrating means within said energy rays collectors for maintained efficiency.

Heretofore tracking devices for concentrating type energy rays collectors have suffered from inaccuracies particularly during periods when the energy rays are diffused which caused the devices to hunt in unpredictable directions. Heretofore clock driven tracking devices have been utilized which require frequent adjustments in order to hold the energy rays collectors in precise alignment for maximum energy collection. For larger concentrating type energy rays collectors, high cost computers are being utilized for the necessary precision tracking.

SUMMARY OF THE INVENTION

I have devised a completely automatic energy rays tracking device for use with any type of energy rays collector whereby the geometric axis or plane of the concentrating means within said energy rays collector is held in alignment with the direction of said energy rays during all conditions within the medium through which said energy rays pass and with additional features whereby the concentrating means is repositioned during the time when neither direct or diffused energy rays are receivable in preparation for the following period of tracking with said concentrating means being cleaned during the time of said repositioning.

The energy rays tracking device is constructed of separable components which can be assembled in various combinations to control movement of energy rays collectors containing various types and shapes of concentrating means. The energy rays tracking device comprises an energy rays tracking means which functions with a receiving means rigidly attached to said concentrating means whereby the direction of direct energy rays is established; and, movement of the concentrating means is controlled whereby the direction of the geometric axis or plane of said concentrating means is moved periodically to align with the direction of said direct energy rays for maximum collection of energy. When said rays are diffused a timed tracking means, which is physically linked with said energy rays tracking means, automatically assumes control whereby the direction of the geometric axis or plane of said concentrating means is kept in close proximity to the direction of said direct energy rays in order to minimize time required to reinitiate collection of energy when said direct energy rays again become receivable. A power control means is automatically actuated when direct and diffused energy rays are not receivable to initiate repositioning and cleaning of said concentrating means. Actuators within the energy rays tracking device and position sensing switches within the energy rays collector control repositioning of said concentrating means. A mirror or lens cleaning means controls the flow of fluids which are sprayed against the concentrating means to clean same while said concentrating means is being repositioned.

The energy rays tracking means in combination with the receiving means provides the primary control for the positioning of the mirror or lens concentrating means to obtain maximum energy collection.

The primary object of the invention is to provide an energy rays tracking device which is relatively inexpensive; but, which is accurate for assuring maximum collection of available energy.

A secondary primary object is to provide an energy rays tracking device which is fully automatic and capable of many years of operation without significant repair and maintenance costs.

Other and further objects of the invention will become apparent upon referring to the detailed description hereinafter following and the drawings annexed hereto.

BRIEF DESCRIPTION OF THE DRAWING

Drawings of three preferred embodiments of the invention are annexed hereto so that the invention may be better and more fully understood; in which.

DESCRIPTION OF A FIRST PREFERRED EMBODIMENT

The energy rays tracking device automatically controls movement of energy rays collectors containing a circular paraboloid shaped mirror whereby when direct or diffused energy rays are receivable tracking is performed and when direct and diffused energy rays are not receivable said energy rays collector is repositioned for start of the following tracking period while said mirror within same is being cleaned. Controlled rotation of said mirror is with a horizontally positioned shaft and around a vertically positioned pivot.

Figure 2:
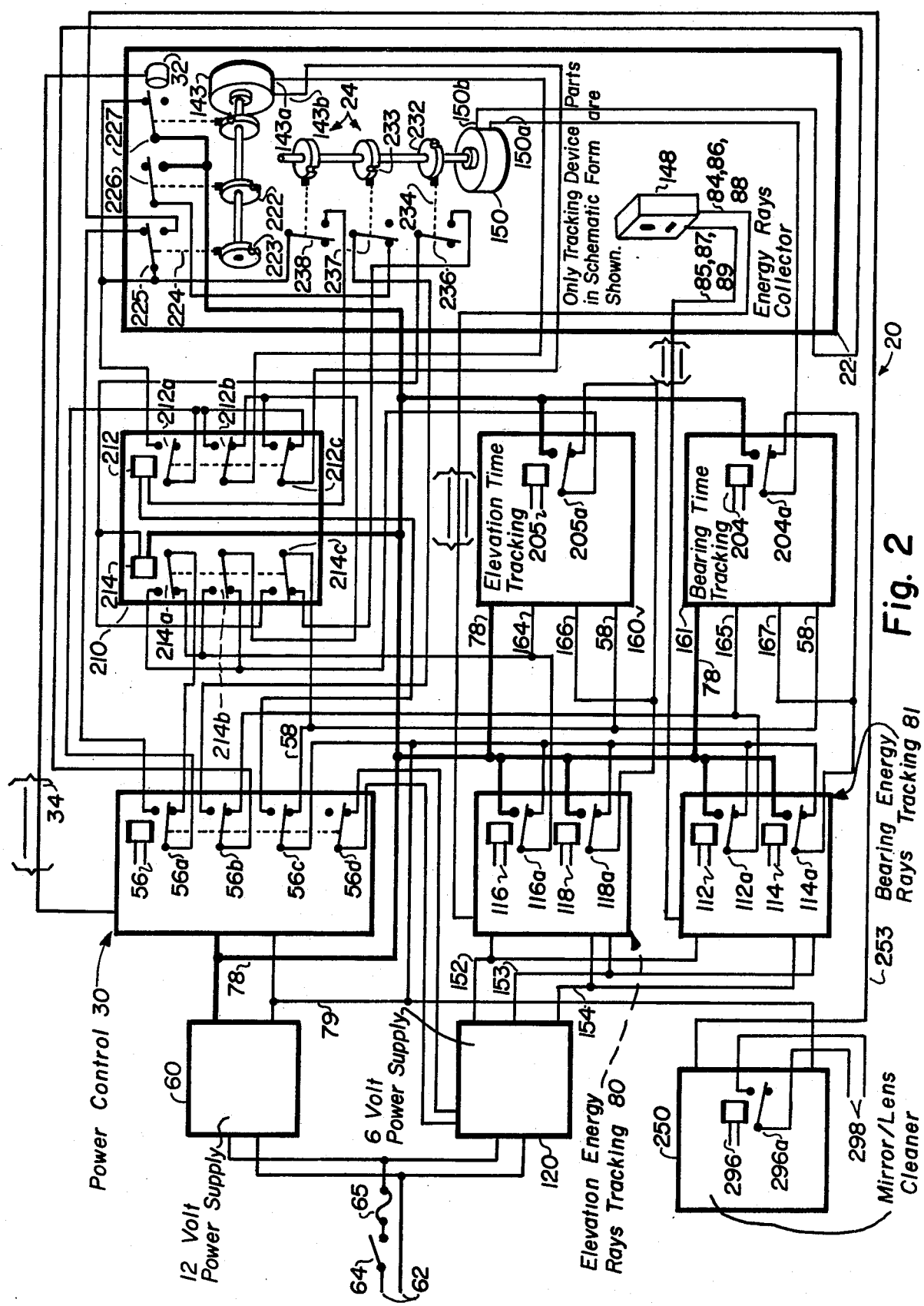
FIG. 2 is a wiring schematic of an energy rays tracking device controlling an energy rays collector containing a circular paraboloid shaped mirror.
Figure 11:
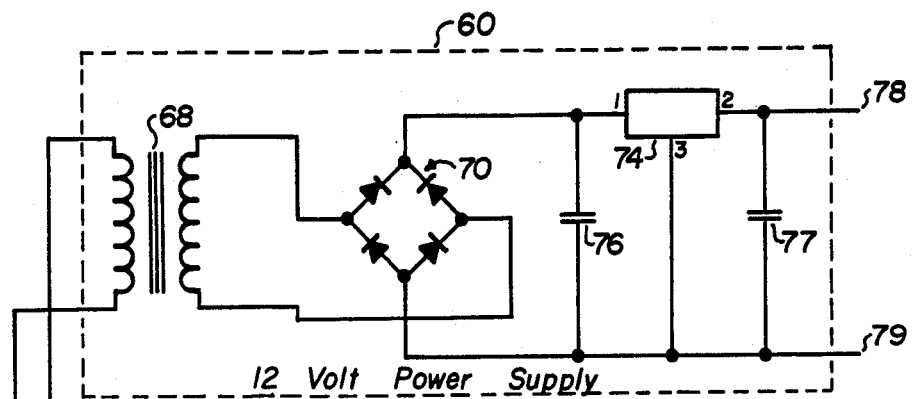
FIG. 11 shows the electronic circuitry for a 12 volt DC power supply.
Figure 12:
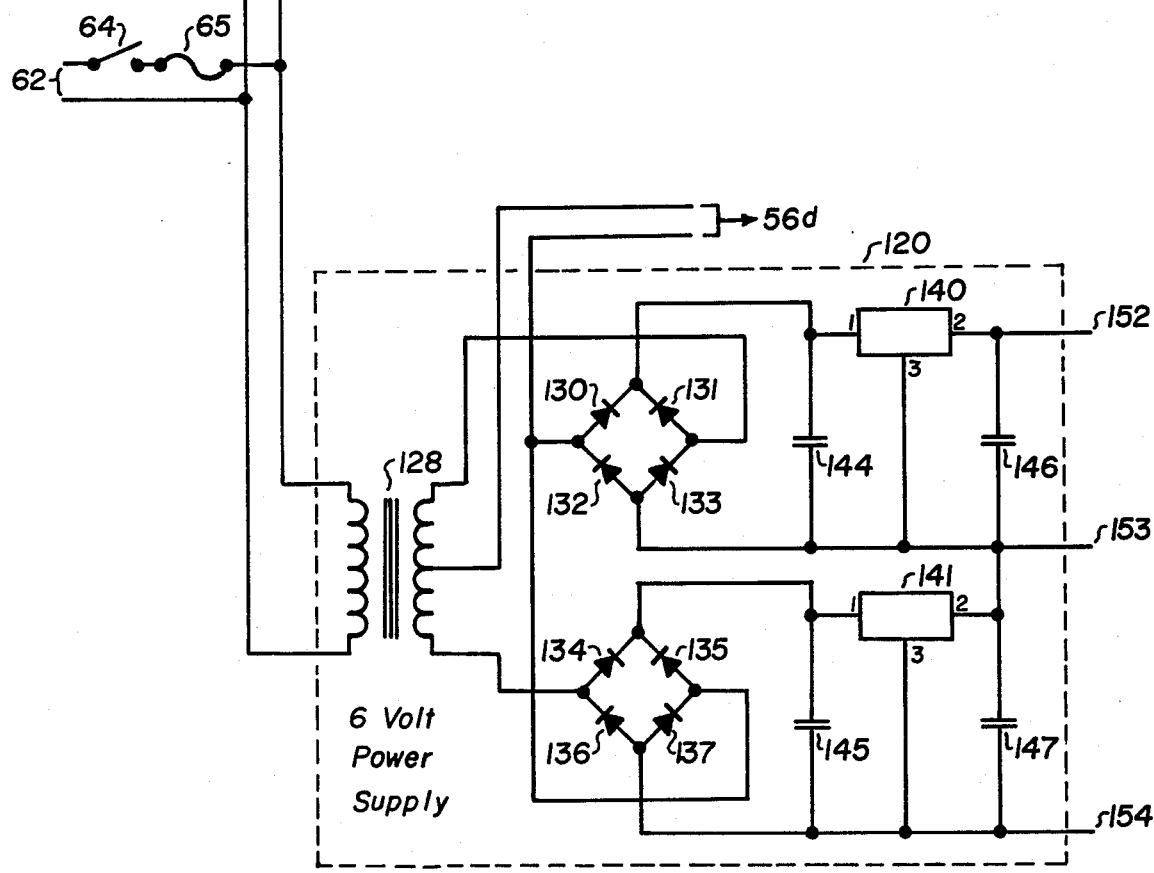
FIG. 12 shows the electronic circuitry for a 6 volt DC power supply. Numerical references are used to designate like elements throughout the various figures of the drawing.

A wiring schematic of the energy rays tracking device 20 is shown in FIG. 2 and generally comprises a power control means 30, a 12 volt DC power supply 60 the electronic circuitry of which is shown in FIG. 11, an elevation energy rays tracking means 80, a bearing energy rays tracking means 81, a 6 volt DC power supply 120 the electronic circuitry of which is shown in FIG. 12, an elevation timed tracking means 160, a bearing timed tracking means 161, an actuator 210 and a mirror cleaning means 250. FIG. 2 only shows the relay coils and contacts within individual means comprising the energy rays tracking device 20. Energy rays tracking device 20 requires a 220 volt, single phase, 50/60 Hertz AC power connection 62 and inputs from within the energy rays collector 22 comprising twin leads 34 from an energy rays sensitive element 32, triple leads 85, 87, and 89 and 84, 86 and 88 from receiving means 148 and various leads from a plurality of position sensing switches 24. Two twin lead outputs from the energy rays tracking device 20 connect to prime movers 143 and 150 within the energy rays collector 22. Twin lead output 298 from mirror or lens cleaning means 250 controls the flow of fluids used in cleaning of the mirror.

All contacts within the energy rays tracking device 20 are shown in their normal deactuated position as would exist during the hours before noon with the direction of the geometric axis of the circular parabolic shaped mirror in alignment with the direction of direct energy rays; and, all contacts within the energy rays collector 22 are shown in their actuated position during the same period. Contacts within energy rays collector 22 return to their normal deactuated condition only when typical cams 222 and 232 rotate with horizontally positioned shaft and vertically positioned pivot until the typical grooves 223 and 233 within said typical cams 222 and 232 align with typical position sensing actuators 224 and 234. The positive 12 volt DC conductor 78 of the 12 volt DC power supply 60 is shown by a heavy line throughout the wiring schematic up to several first sets of contacts. With contacts positioned as noted above, prime movers 143 and 150 are stopped which can be shown by tracing out continuity paths. Starting at prime mover terminal 150a, continuity path is through contacts 204a and 114a to negative 12 volt DC conductor 79; and, starting at prime mover terminal 150b, continuity path is through contacts 56b and 112a to the same negative 12 volt DC conductor 79 to which prime mover terminal 150a is connected; therefore, there is no potential difference across the terminals and prime mover 150 is stopped. Likewise, starting at prime mover terminal 143a, continuity path is through contacts 212b, 214b, 205a and 118a to negative 12 volt DC conductor 79; and, starting at prime mover terminal 143b, continuity path is through contacts 212c, 56a, 214a and 116a to the same negative 12 volt DC conductor 79 to which terminal 143a is connected; therefore, there is no potential difference across the terminals and prime mover 143 is stopped.

Figure 7:
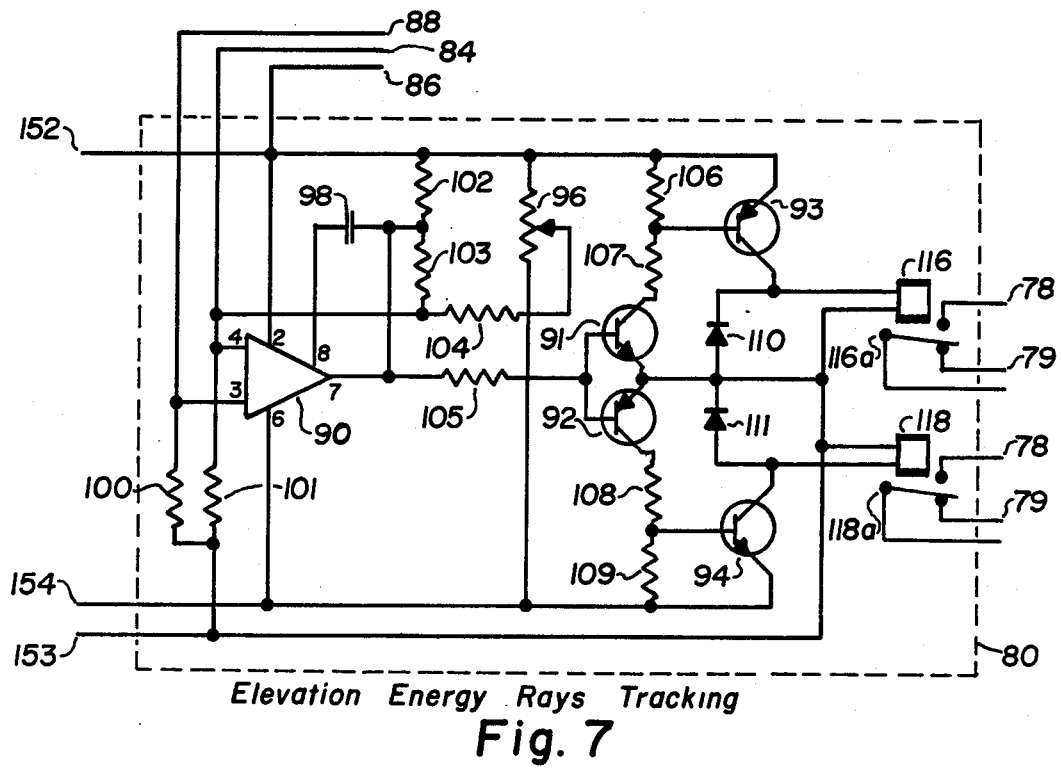
FIG. 7 shows the electronic circuitry for a energy rays tracking means.

The elevation energy rays tracking means 80 controls automatic tracking of only direct energy rays in the elevation direction. When said energy rays are diffused there is no control output from said energy rays tracking means 80. The elevation energy rays tracking means 80 has a 6 volt DC power supply 152, 153 and 154 which is activated only when direct or diffused energy rays are receivable and a triple lead input 84, 86 and 88 from one differential sensor 82 within receiving means 148. With said receiving means 148 being rigidly secured to the circular paraboloid shaped mirror, when direct energy rays are receivable said differential type sensor 82 signals the elevation energy rays tracking means 80 that a balanced condition exists only if the direction of the geometric axis of said mirror aligns with the direction of said direct energy rays. When such a balance condition does not exist, as would occur periodically as the earth and the energy rays collector with said mirror and said receiving means 148 rotate relative to the sun and with said direct energy rays being received by differential sensor 82, said elevation energy rays tracking means 80 will detect the direction of imbalance and control power to prime mover 143 to cause elevation rotational movement for repositioning of said mirror until a balanced condition is again established at which time all action will again stop. Depending on the direction of an imbalance as signaled by differential sensor 82 either relay coil 116 or 118 will be energized. Prime mover 143 will rotate to elevate said mirror if contact 118a is actuated; and, said prime mover 143 will rotate to depress said mirror if contact 116a is actuated. Prime mover rotations can be shown by tracing out current continuity paths. Starting with actuated contact 118a connected to positive 12 volt DC conductor 78, current continuity path is through contacts 205a, 214b and 212b, to prime mover terminal 143a, and from prime mover terminal 143b, through contacts 212c, 56a, 214a and 116a to negative 12 volt DC conductor 79. Prime mover 143 rotates since there is a 12 volt potential difference across the terminals; and, rotation is in a direction to elevate said mirror since actuation of contact 205a in timed tracking means 160 would cause rotation in the same direction during hours before noon as described hereinafter. Likewise, starting with actuated contact 116a connected to positive 12 volt DC conductor 78, current continuity path is through contacts 214a, 56a and 212c to prime mover terminal 143b, and from prime mover terminal 143a, through contacts 212b, 214b, 205a and 118a to negative 12 volt DC conductor 79. Prime mover 143 rotates since there is a 12 volt DC conductor 79. Prime mover 143 rotates since there is a 12 volt potential difference across the terminals; and, rotation is in a direction to depress said mirror since the current flow direction through prime mover 143 is opposite to the current flow direction when contact 118a is actuated. FIG. 7 shows the electronic circuitry for elevation energy rays tracking means which includes integrated circuit 90 and balancing potentiometer 96.

Figure 1:
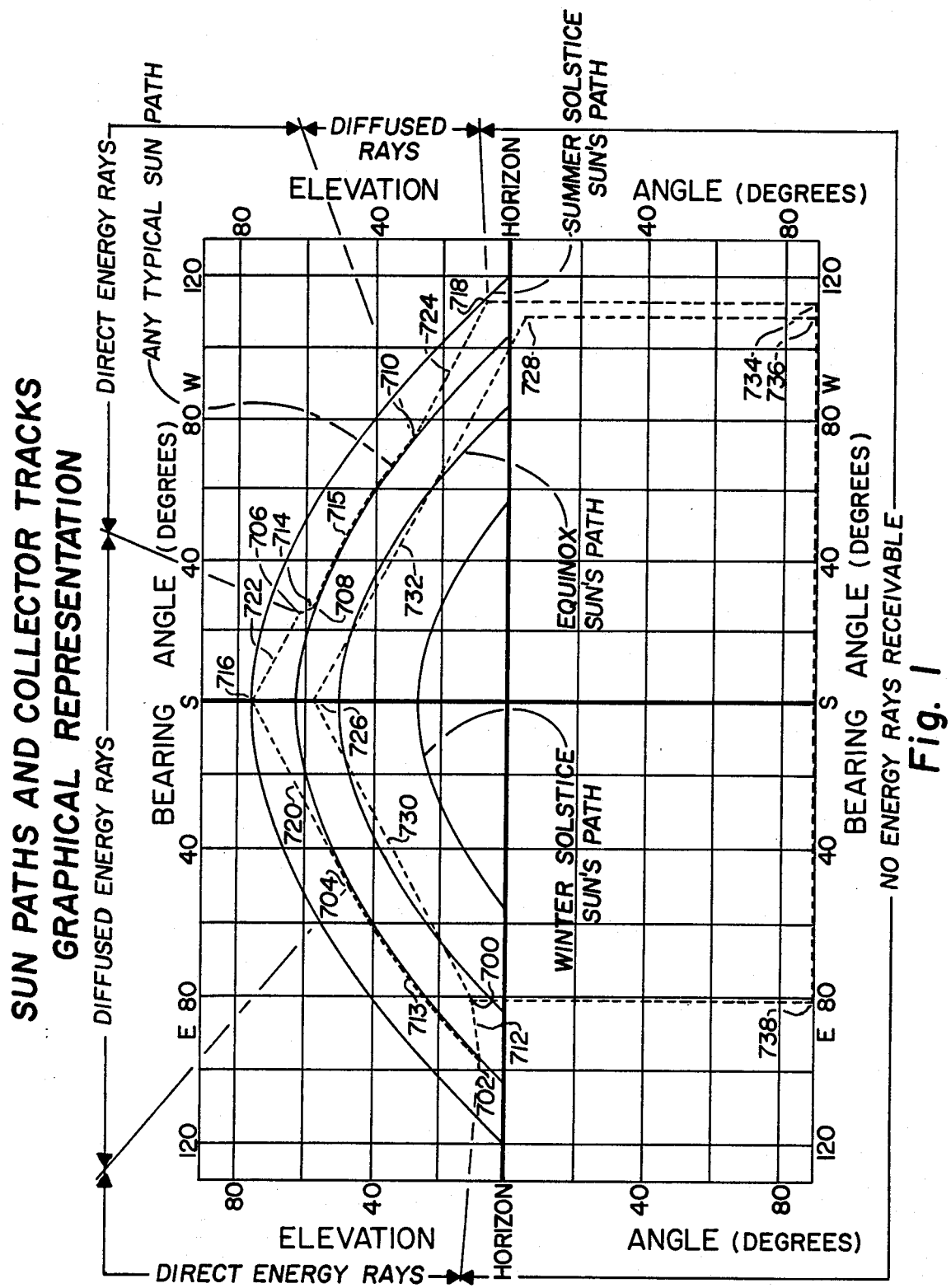
FIG. 1 is a graphical representation of Sun Paths and Energy Rays Collector Tracks for various operating modes (Energy rays collector containing a circular paraboloid shaped mirror)

The bearing energy rays tracking means 81 is physically and functionally identical to elevation energy rays tracking means 80 for control of prime mover 150 which provides bearing rotational movement for repositioning of the circular paraboloid shaped mirror. Bearing energy rays tracking means 81 has a triple lead input 85, 87 and 89 from a second differential type sensor 83 within receiving means 148. The combined action of energy rays tracking means 80 and 81 provide the primary control action of energy rays tracking device 20 to automatically and accurately track direction of direct energy rays for maximum energy collection. This action is best illustrated by FIG. 1 between positions 700-702-704 and 706-708-710 where lines 712 and 714 represent tracks of the direction of the geometric axis of said mirror before alignment with the direction of direct energy rays has been established; and, lines 713 and 715 represent continuation of the same tracks after they become coincident with "Any Typical Sun Path" when alignment with direct energy rays has been established. Position 700 is established by position sensing switches within energy rays collector 22 as the starting position for each tracking period.

Figure 5:
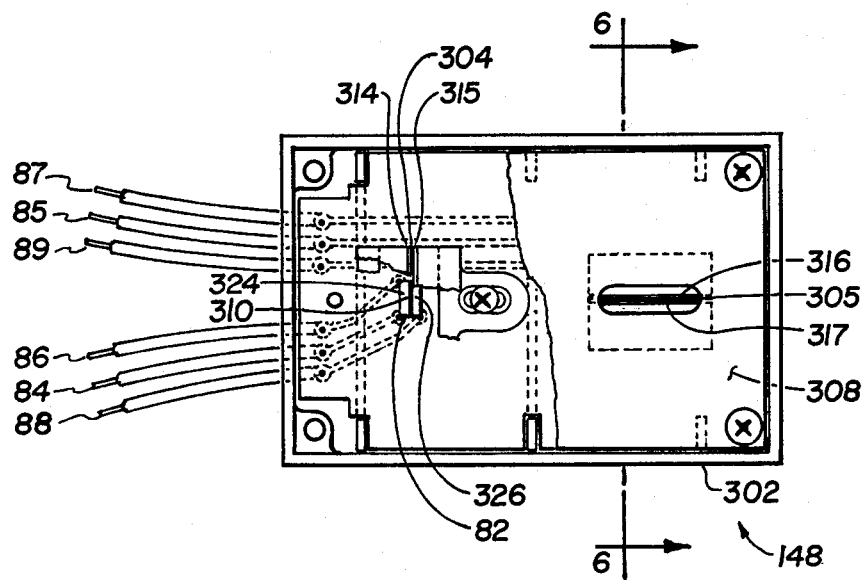
FIG. 5 is a view of the front face of the receiving means with the enclosure partly broken away to more clearly illustrate the details of construction.
Figure 6:
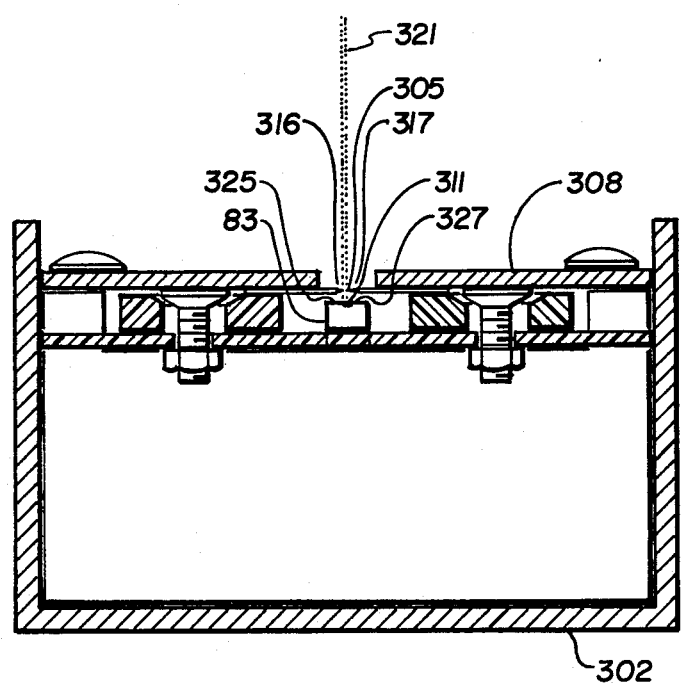
FIG. 6 is an enlarged cross-sectional view taken along line 6—6 of FIG. 5.

The receiving means 148, as shown in FIGS. 5 and 6, comprises a housing 302 being impervious to direct and diffused energy rays. Said housing surrounds two differential sensors 82 and 83 except for straight slit openings 304 and 305 positioned against the inside surface of one wall 308 of said housing 302. Each said differential sensor has a straight narrow neutral band centrally located across its face which acts as a divider between two differential elements 324 and 326 or 325 and 327 exposed on the same face. Said differential sensors are mounted within the housing 302 such that the direction of the neutral band 310 of differential sensor 82 is positioned at a right angle to the direction of the neutral band 311 of differential sensor 83. Both said sensors are also positioned with their faces parallel to and with fifteen thousandths of an inch more or less in clearance with the inside surfaces of two razor edges which form each said straight slit opening. Straight slit opening 304 formed by razor edges 314 and 315 is positioned parallel to and in alignment with said neutral band 310 such that a plane drawn thrugh said straight slit opening 304 and through said neutral band 310 is positioned at a right angle to the face of said differential sensor 82 and the inside surface of wall 308. Likewise straight slit opening 305 formed by razor edges 316 and 317 is positioned parallel to and in alignment with said neutral band 311 such that a plane drawn through said straight slit opening 305 and through said neutral band 311 is positioned at a right angle to the face of differential sensor 83 and the inside surface of wall 308. Said receiving means 148 is rigidly secured to the mirror whose position the energy rays tracking device is controlling. Said receiving means 148 is mounted on a staff which provides separation between said receiving means 148 and the collector assembly of the energy rays collector to prevent excessive indirect radiation from reaching receiving means 148. Said receiving means 148 is positioned relative to the mirror such that wall 308 is perpendicular to the geometric axis of said mirror and with the direction of the neutral band 310 of differential sensor 82 positioned parallel with the centerline of the horizontally positioned rotational shaft of said mirror and with the direction of the neutral band 311 of differential sensor 83 positioned parallel with the centerline of the vertically positioned rotational pivot of said mirror. When there are direct energy rays and the direction of the geometric axis of said mirror is in alignment with the direction of said direct energy rays, only a thin ribbon 320 and 321 of said energy rays is allowed to enter said housing 302 through straight slit openings 304 and 305 to strike the neutral bands 310 and 311 of differential sensors 82 and 83. As the earth and the energy rays collector with said mirror and said receiving means 148 rotate relative to the sun said ribbons 320 and 321 of said direct energy rays sweep to the side of said neutral bands 310 and 311 to strike differential element 324 or 326 and 325 or 327 of differential sensors 82 and 83. This causes an imbalance condition between the common leads 86 and 87 and two end conductor leads 84 and 88 or 85 and 89 from each said differential sensor; and, this imbalance condition is used as input to the energy rays tracking means 80 and 81 whereby the mirror with said receiving means 148 is automatically rotated into a new position where a balance condition is reestablished within said receiving means 148 with all tracking action then being stopped.

Figure 9:
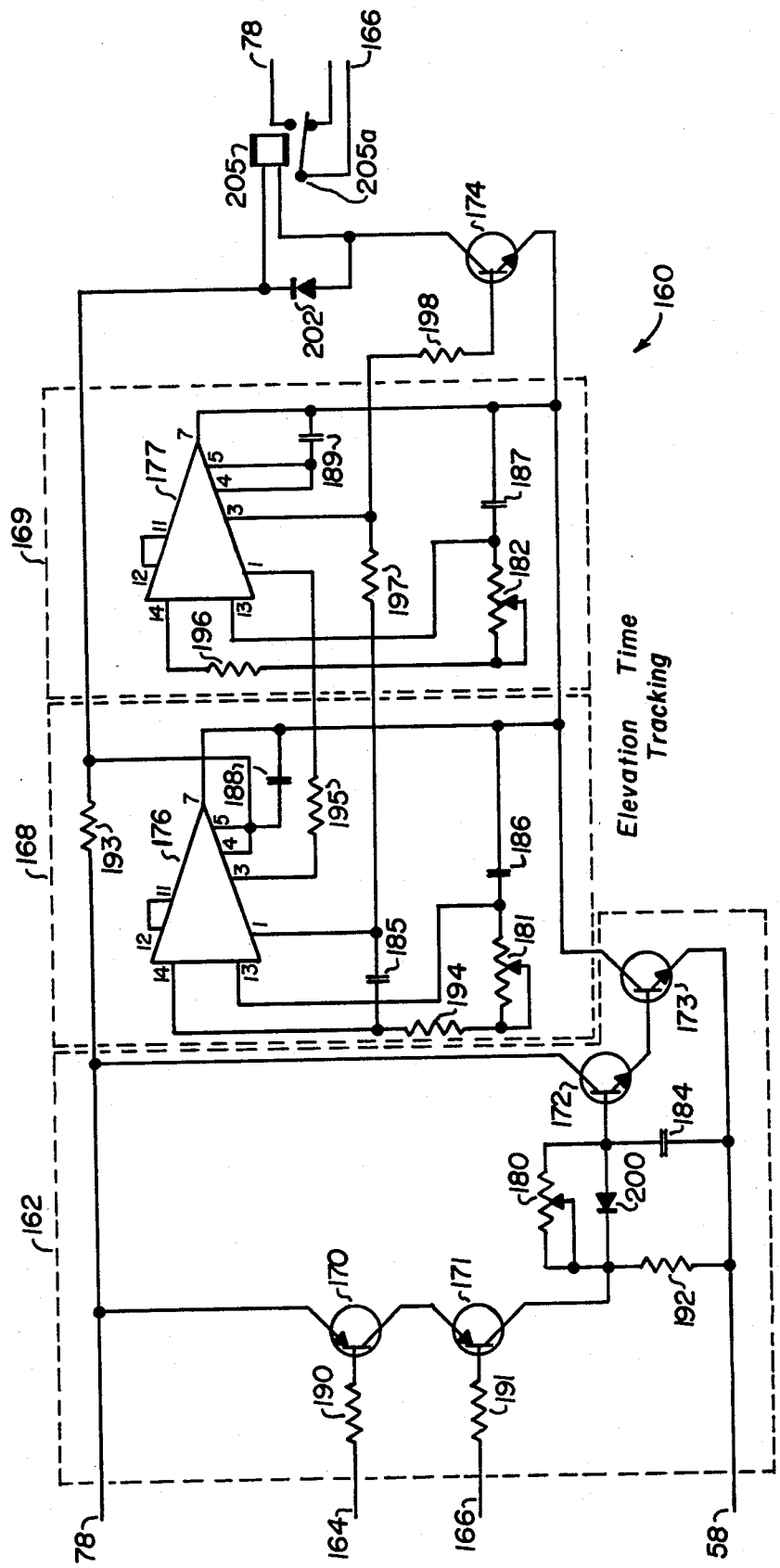
FIG. 9 shows the electronic circuitry for a timed tracking means.

The elevation timed tracking means 160 controls automatic proximity tracking of direct energy rays in the elevation direction as long as said energy rays are diffused before reaching said receiving means in order that a minimum of time is required for elevation energy rays tracking means to bring the direction of the geometric axis of the mirror in elevation directional alignment with the direction of direct energy rays when they again become receivable. The elevation timed tracking means 160 has 12 volt DC power supply leads 78 and 58 which are energized by deactuated contact 56c only during periods when direct or diffused energy rays are receivable and said elevation time tracking means 160 has input leads 164 and 166 which being connected to the wiper connection of contact 116a or 118a within elevation energy rays tracking means 80 indicates the output operating condition of said elevation energy rays tracking means 80. An automatic time delayed switching section 162 between said input leads 164 and 166 and the power control transistor 172 for elevation timed tracking means 160 as best illustrated in FIG. 9 allows elevation timed tracking means 160 to function only if there is no control output from elevation energy rays tracking means 80 within an adjustable time period which indicates that said energy rays are diffused. Transistor 172 will switch "ON" power to elevation timed tracking means 160 only when the threshold voltage is exceeded in the connection to transistor 172 base. Connection of the positive 12 volt DC conductor 78 to transistor 172 base is controlled by transistors 170 and 171 whose collectors and emitters are series connected between said transistor 172 base and said positive 12 volt DC conductor 78. Transistors 170 or 171 in turn are functionally controlled by interconnections from transistor 170 or 171 bases through resistors 190 or 191 through leads 164 or 166 to the common connection of contact 116a or 118a within said elevation energy rays tracking means 80 which causes either transistor 170 or 171 to switch "OFF" in pulses when said elevation energy rays tracking means 80 is functioning. Build up of said threshold voltage in transistor 172 base is time delayed beyond the time period between said pulses in order to maintain the elevation timed tracking means 160 deactuated while the elevation energy rays tracking means 80 is functioning. Connection of the positive 12 volt DC conductor 78 to said transistor 172 base is time delay controlled by potentiometer 180 series connected between transistor 171 collector and said transistor 172 base and by capacitor 184 parallel connected with said transistor 172 between transistor 172 base and negative 12 volt DC conductor 58. Capacitor 184 is discharged through diode 200 parallel connected with potentiometer 180 and through resistor 192 to negative 12 volt DC condustor 58. Resistor 192 is sized whereby potentiometer 180 provides controlled current flow to both the transistor 172 base and capacitor 184 when both transistors 170 and 171 are switched "ON". Capacitor 184 is sized whereby the voltage build-up across the capacitor plates and said transistor 172 base is gradual, starting when both transistors 170 and 171 are switched "ON" and continuing until either transistor 170 or 171 is switched "OFF" or until the threshold voltage of transistor 172 base is exceeded and transistor 172 is switched "ON". When either transistor 170 or 171 is switched "OFF" in pulses, capacitor 184 is discharged through diode 200 through transistor 192 to negative 12 volt DC conductor 58 reinitiating start of said timed period. After the timed period of time delay circuit 162 passes, elevation timed tracking means 160 is allowed to function only as long as no output from said elevation energy rays tracking means 80 is indicated through leads 164 and 166. Time delay circuit 162 controls the power supply to the first timing section 168 of elevation timed tracking means 160 which establishes a length of time that contact 205a is held in an actuated condition. At the end of the actuation time period, the power supply is automatically transfered to a second timing section 169 which establishes length of time that contact 205a is in a normal deactuated condition. At the end of the deactuated time period, the power supply is automatically transferred back to the first timing section 168 completing one cycle of an action within said elevation timed tracking means 160 which continues only as long as said timing sections are allowed to function. Prime mover 143 will rotate to elevate the mirror when contact 205a is actuated during the hours before noon. This upward elevation rotational motion is reversed to a downward motion at noon by deactuation of contact 236 within the energy rays collector 22. This deactuation of contact 236 causes relay coil 214 within actuator 210 to become energized as shown by a current continuity path trace. Starting at positive 12 volt DC conductor 78 at one terminal of relay coil 214 and continuing through said relay coil 214 through deactuated contact 236 through momentarily deactivated auxiliary contact 214c through contact 56c to negative 12 volt DC conductor 79. Relay coil 214 continues to be held energized, after contact 236 again becomes actuated, by actuated auxillary contact 214c as shown by a current continuity path trace starting at negative 12 volt DC conductor 79 and continuing through contact 56c through activated contact 214c through relay coil 214 to positive 12 volt DC conductor 78. Actuation of contacts 214a and 214b by energized relay coil 214 reverses current flow through prime mover 143 to effect the change of direction in elevation rotational movement. During hours after noon the elevation rotational movement of the mirror will continue in a downward direction until relay coil 56 of power control means 30 is energized as described hereinafter.

The bearing timed tracking means 161 is physically and functionally identical to elevation timed tracking means 160 for control of prime mover 150 which provides bearing rotational movement in only one direction for positioning of the circular parabola shaped mirror. The combined action of timed tracking means 160 and 161 is best illustrated by FIG. 1 between positions 704-716-706 and 710-718 where lines 720, 722 and 724 represent tracks of the direction of the geometric axis of the mirror as controlled by the timed actuation of prime movers 143 and 150. The slope of said tracks 720, 722 and 724 is changed by varying the time periods within timed tracking means 160 and 161. Position 716 located at noon is where the elevation direction is reversed. Position 718 is shown to indicate actuation of power control means 30 when daylight conditions end before said mirror faces toward the horizon and when energy rays are diffused. Tracks 730 and 732 between positions 700-726 and 726-728 indicate a condition where energy rays are diffused for a complete day and where daylight conditions end after said mirror has been depressed below the horizon. Position 700, which is the starting position for each days energy rays tracking sequence is indicated elevated 10° above the horizon. This elevated position is to be adjustable for insuring that wall 308 of receiving means 148, as shown in FIG. 5, is exposed to direct energy rays when they become receivable and to assure that contact 227 within energy rays collector 22, as shown in FIG. 2, is deactuated and reactuated prior to the time when the mirror reaches position 718 as shown in FIG. 1. This is to prevent contact 227, which is deactuated at two positions (where the tracking path crosses at 10° above the horizon), from blocking all further action after actuation of power control means 30.

Figure 8:
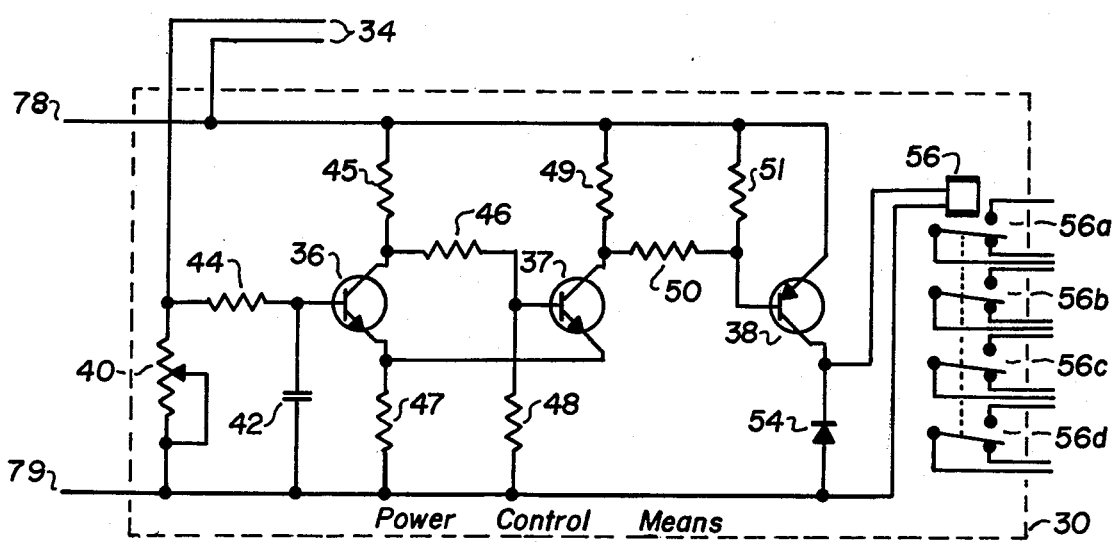
FIG. 8 shows the electronic circuitry for a power control means.

The power control means 30 controls automatic switching of all means within said energy rays tracking device 20 from a tracking sequence when direct or diffused energy rays are receivable to a mirror repositioning and cleaning sequence when said direct and diffused energy rays are not receivable and vice versa. The power control means 30 has a continuous 12 volt DC power supply 78 and 79 and a twin lead input 34 from an element (photocell) 32 which is sensitive to direct and diffused energy rays. Four contacts within power control means 30 are actuated by a single output relay coil 56 as shown in FIG. 2. FIG. 8 shows the electronic circuitry for power control means 30. Relay coil 56 is energized only when direct and diffused energy rays are not receivable which causes the resistance through element 32 to rise and transistors within the electronic circuit are switched "ON". Sensitivity is controlled by adjustment of potentiometer 40. Contact 56d controls power supply to rectifiers within the 6 volt DC power supply 120.

Deactuated contact 56c connects −12 volt dc power supply 79 through lead 58 to timed tracking means 160 and 161 and to the common connector, which is the wiper connection, of auxiliary holding contact 214c of actuator 210 during periods when direct or diffused energy rays are receivable; actuated contact 56c connects −12 volt dc power supply 79 only with relay coil 212 of actuator 210 during periods when direct or diffused energy rays are not receivable. Contact 56b controls the 12 volt DC power supply change over within the circuitry to prime mover 150 for said tracking and for repositioning/cleaning sequences. Contact 56a controls 12 volt DC power supply change over within the circuitry to prime mover 143 for said tracking and for repositioning/cleaning sequences.

Repositioning of the energy rays collector for start of the following period of tracking sequence is initiated, after direct and diffused energy rays are not receivable, by actuation of contacts within the power control means 30. To clearly understand this repositioning sequence FIG. 2 should be referred to for the circuit arrangement and FIG. 1 should be referred to where indicated for a graphical representation of the actions. Actuation of contact 56d results in power interruption to rectifiers within the 6 volt DC power supply 120. Actuation of contact 56c results in interruption of −12 volt dc power supply 79 to time tracking means 160 and 161 and to auxiliary holding contact 214c of actuator 210; actuation of contact 56c results in connection of −12 volt dc power supply to relay 212 of actuator of 210. Actuation of contact 56b provides change over within the 12 volt DC power supply circuitry to prime mover 150 for said repositioning sequence. Initially prime mover 150 is stopped which can be shown by tracing out the continuity path starting at prime mover terminal 150a and continuing through contacts 204a and 114a to negative 12 volt DC conductor 79; and, starting at prime mover terminal 150b and continuing through actuated contacts 56b and 237 to actuated contact 226 which being "OPEN" breaks the circuit to positive 12 volt DC conductor 78 and keeps prime mover 150 from operating. Actuation of contact 56a provides change over within the 12 volt DC power supply circuitry to prime mover 143 for said repositioning sequence. Initially prime mover 143 operates to depress the mirror from a direction facing a position represented by 718 or 728 as shown in FIG. 1 to a direction facing downward represented by 734 or 736 as shown in FIG. 1. This operation of prime mover 143 can be shown by tracing out the current continuity path starting at positive 12 volt DC conductor 78 located at actuated contact 227 and continuing through actuated contacts 225 and 56a through contact 212c, to prime mover terminal 143b and from prime mover terminal 143a through contacts 212b, 214b, 205a and 118a to negative 12 volt DC conductor 79. Prime mover 143 rotates since there is a 12 volt potential difference across the terminals; and, rotation is in a direction to depress the mirror since current flow is opposite to that when contact 205a in elevation timed tracking means 160 is actuated during hours before noon. Shortly before the mirror faces in a downward direction (734 or 736 in FIG. 1) contact 226 becomes deactuated and shortly thereafter contact 225 becomes deactuated. Deactuated contact 226 starts counter clockwise rotation of prime mover 150 which can be shown by tracing out the current continuity path starting at positive 12 volt DC conductor 78 and continuing through deactuated contact 226, through actuated contacts 237 and 56b to prime mover terminal 150b and from prime mover terminal 150a through contacts 204a and 114a to negative 12 volt DC conductor 79. Prime mover 150 rotates since there is a 12 volt potential difference across the terminals; and, rotation is in a counter clockwise direction since current flow is opposite to that when contact 204a in bearing timed tracking means 161 is actuated during the tracking sequence. Deactuated contact 225 interrupts power supply to prime mover 143 stopping its rotation and simultaneously connects positive 12 volt DC conductor 78 with mirror or lens cleaning means 250 initiating its operation. With prime mover 143 stopped, prime mover 150 rotates the energy rays collector back to a position represented by 738 in FIG. 1 with the mirror being cleaned by mirror or lens cleaning means 250 during the same time. Shortly before reaching position 738 contact 238 becomes deactuated and shortly thereafter contact 237 becomes deactuated. Deactuated contact 238 starts rotation of prime mover 143 to elevate the mirror which can be shown by tracing out the current continuity path starting at positive 12 volt DC conductor 78 and continuing through actuated contact 227, through deactuated contact 238, through relay coil 212 through actuated contact 56c to negative 12 volt DC conductor 79. Relay coil 212 becomes energized resulting in current flow from positive conductor 78 through actuated contacts 227, 212a and 212b to prime mover terminal 143a and from prime mover terminal 143b through actuated contact 212c, through contacts 214b, 205a and 118a to negative 12 volt DC conductor 79. Prime mover 143 rotates since there is a 12 volt potential difference across the terminals; and, rotation is in an upward direction since current flow is the same as when contact 205a, in elevation timed tracking means 160, is actuated during hours before noon. When prime mover 143 begins to rotate, contacts 225 and 226 return to their actuated condition again interrupting the power supply to mirror or lens cleaning means 250; and, prime mover 143 continues to rotate the circular parabola shaped mirror in an upward direction since relay coil 212 remains energized. Unactuated contact 237 interrupts power supply to prime mover 150 stopping its rotation. When the mirror faces a position represented by position 700 in FIG. 1, contact 227 becomes deactuated stopping prime mover 143 and further upward rotation of said mirror. All further action is stopped until direct or diffused energy rays again become receivable at which time power control means 30 assumes its normal deactuated condition initiating start of the following period of tracking.

Figure 10:
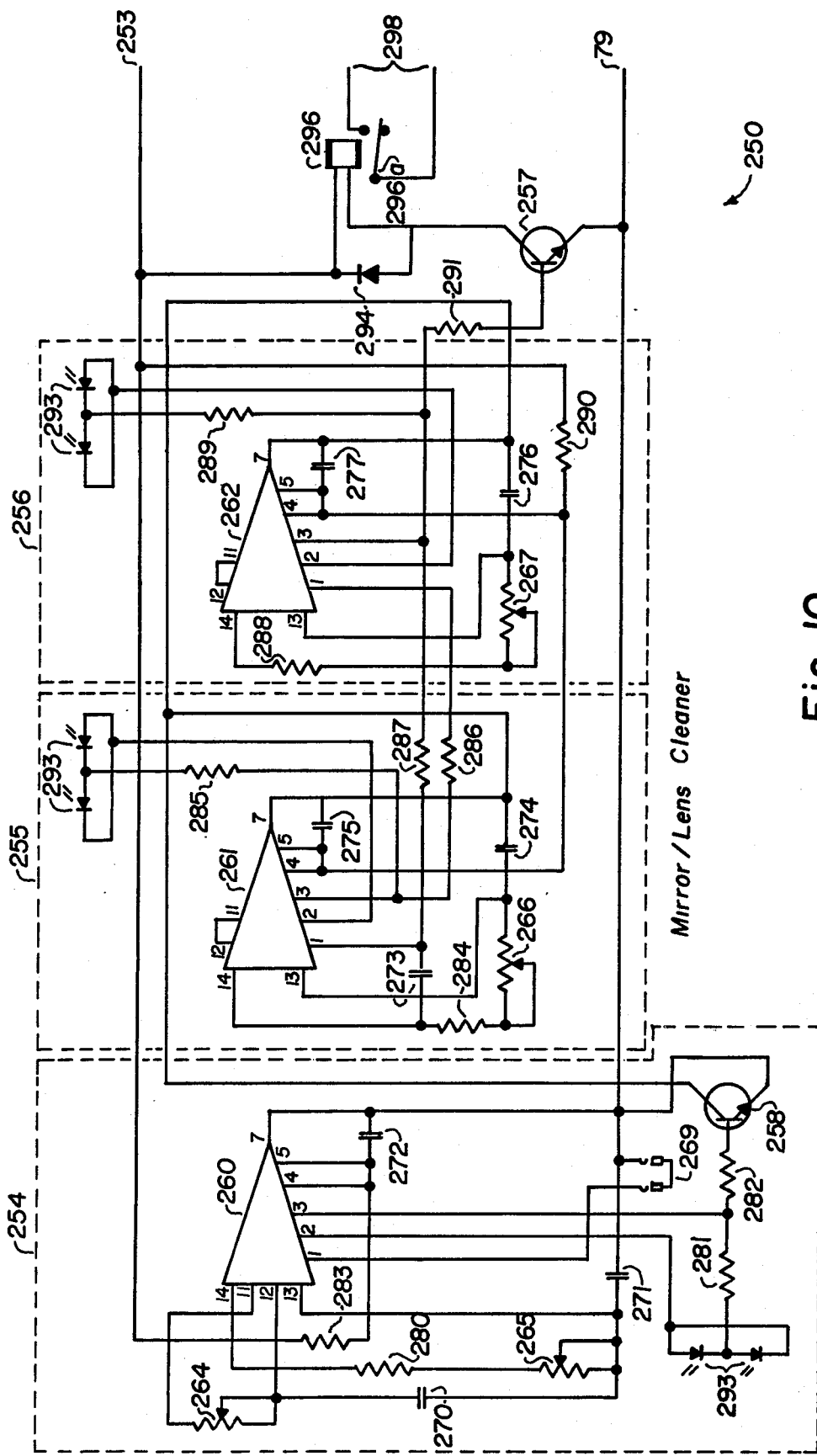
FIG. 10 shows the electronic circuitry for a mirror or lens cleaning means.

The mirror or lens cleaning means 250 as shown in FIGS. 2 and 10 automatically controls actuation of pumps and valves which cause fluids to be sprayed against the mirror for cleaning same during the repositioning sequence. Power supply to said mirror or lens cleaning means 250 comprises a negative 12 volt DC conductor 79 and a positive 12 volt DC conductor 253 which is switched "ON" by deactuated contact 225 during time said mirror is being repositioned and facing toward spray nozzles. When power is supplied to said mirror or lens cleaning means 250 a total time section 254, which has two potentiometers 264 and 265 for adjustment of the length of the total period, is switched "ON", said section controls the total time of the cleaning sequence. A cleaning time section 255, with adjustable potentiometer 266 and power input taken from output of total time section 254, controls length of a cleaning time period with output relay 296 being held energized. At the end of the cleaning time period there is automatic switching of power to a pause time section 256, with adjusting potentiometer 267 which controls length of a pause time period whereby output relay 296 is left deenergized. At the end of the pause time period there is automatic switching of power back to the cleaning time section 255 for a complete cycle. Said cycling continues as long as the total time period, as set by total time section 254, is not exceeded. The power supply to mirror or lens cleaning means 250 is automatically interrupted when the mirror is moved away from facing said spray nozzles.

DESCRIPTION OF A SECOND PREFERRED EMBODIMENT

The energy rays tracking device 25 automatically controls unidirectional movement of energy rays collectors containing a linear parabola shaped mirror whereby energy rays are tracked when said energy rays are receivable and when direct and diffused energy rays are not receivable said energy rays collector is repositioned for start of the following tracking period with said mirror being cleaned during the period of said repositioning. Rotation of said mirror is with an inclined shaft whose inclination is fixed relative to the horizon.

Figure 3:
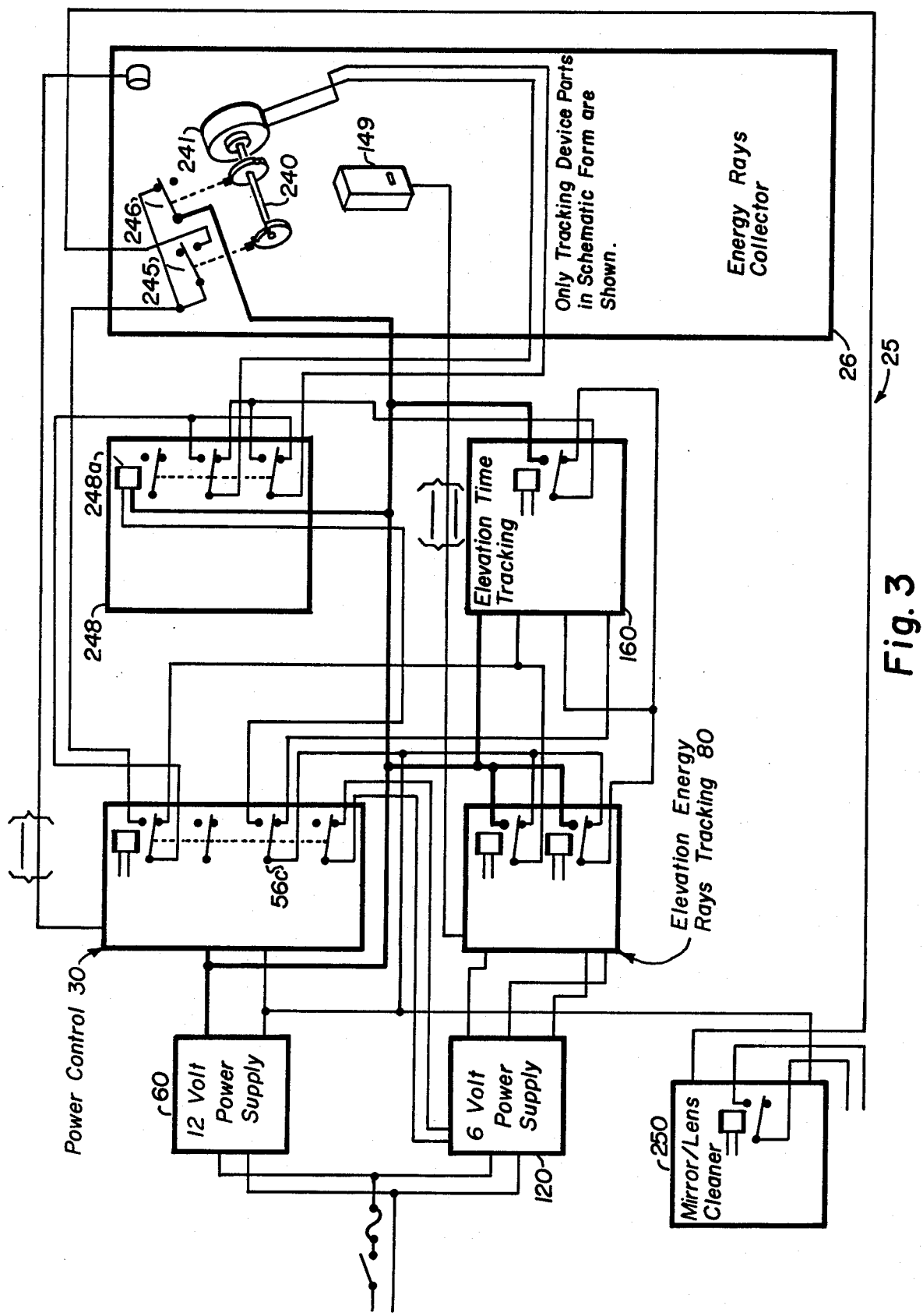
FIG. 3 is a wiring schematic of an energy rays tracking device controlling an energy rays collector containing a linear parabola shaped mirror with unidirectional movement.

A wiring schematic of the energy rays tracking device 25 is shown in FIG. 3 and generally comprises a power control means 30, a 12 volt DC power supply 60, an equinox energy rays tracking means 80, a 6 volt DC power supply 120, an equinox timed tracking means 160, an actuator 248 and a mirror or lens cleaning means 250. FIG. 3 only shows the relay coils and contacts within individual means comprising the energy rays tracking device 25. Components within energy rays tracking device 25 and energy rays collector 26 are physically and functionally the same as in the First Preferred Embodiment except for special features as hereinafter described.

The energy rays collectors whose positions are controlled by energy rays tracking device 25 contain a linear parabola shaped mirror which is rotated about a single shaft 240 which is positioned inclined to the horizon such that an imaginary line positioned perpendicular to and extending through the focal and vertex lines of said mirror will align with the direction of direct energy rays at noon during equinox.

The energy rays tracking device 25, unlike the First Preferred Embodiment, controls automatic rotational movement of the linear parabola shaped mirror in only one direction. This method of control requires use of only one energy rays tracking means, one timed tracking means and one actuator. Actuator 248 is required to reverse direction of current flow at the beginning of the period said mirror is repositioned in order to maintain rotation of prime mover 241 in the same direction as when direct energy rays are being tracked. Relay 248a within actuator 248 is energized by actuation of contact 56c within power control means 30. Deactuated contact 245 supplies power to mirror or lens cleaning means 250 only when said mirror is facing down toward spray heads while said mirror is being repositioned. Contact 246 becomes deactuated to stop all further action of repositioning when said mirror faces the horizon from which direct energy rays may first be received. A single differential sensor within the receiving means 149 is aligned with the direction of its neutral band and associated slit being positioned parallel with the centerline of the inclined shaft 240 and parallel with geometric plane of said mirror.

DESCRIPTION OF A THIRD PREFERRED EMBODIMENT

The energy rays tracking device 27 automatically controls bidirectional movement of energy rays collectors containing a linear parabola shaped mirror whereby direct or diffused energy rays are tracked when said energy rays are receivable and when direct and diffused energy rays are not receivable said energy rays collector is positioned for start of the following tracking period with said mirror being cleaned during the period of said repositioning. Rotation of said mirror is with an inclined shaft whose inclination is adjustable with respect to the horizon.

Figure 4:
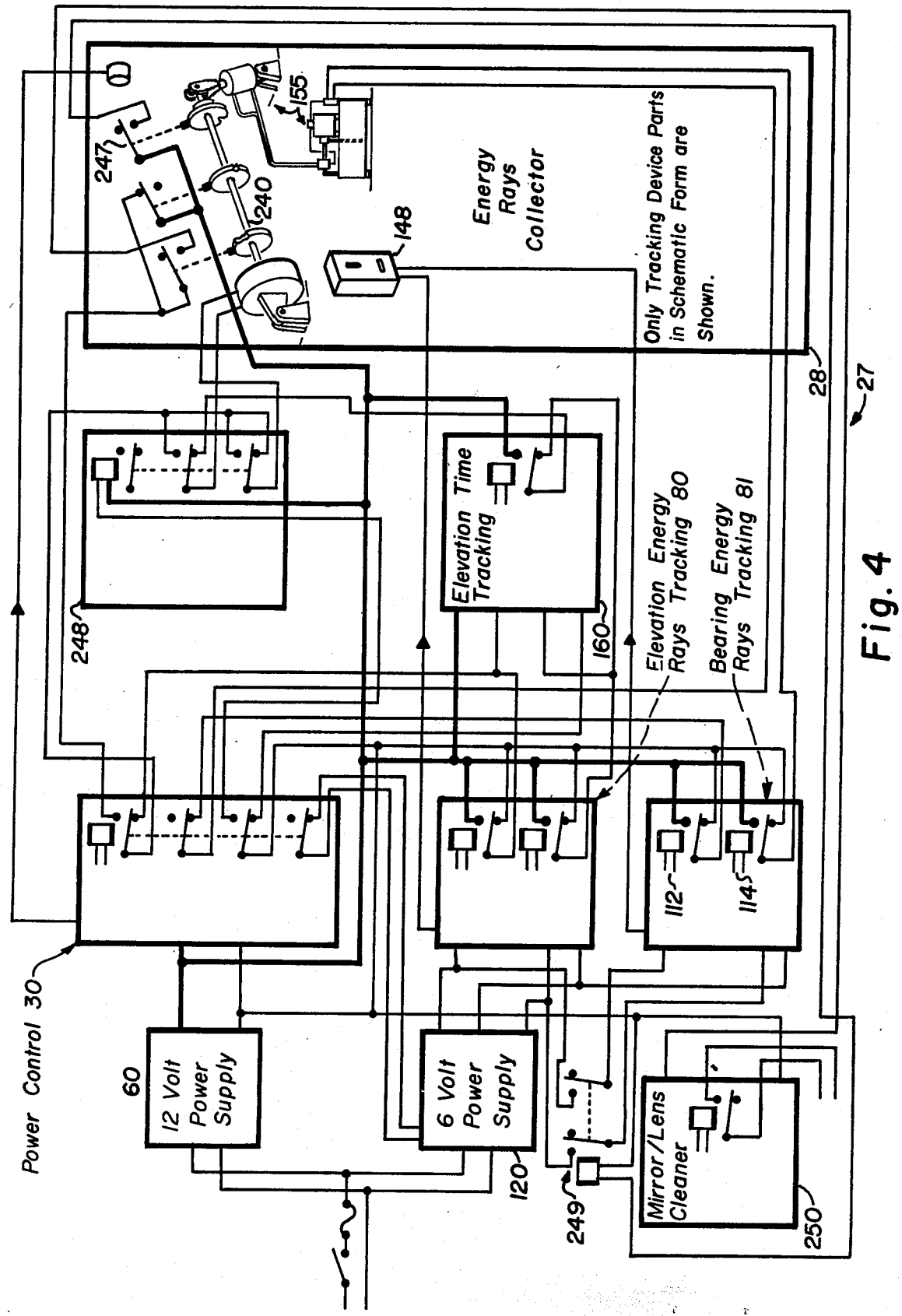
FIG. 4 is a wiring schematic of an energy rays tracking device controlling an energy rays collector containing a linear parabola shaped mirror with bidirectional movement.

A wiring schematic of the energy rays tracking device 27 is shown in FIG. 4 and generally comprises a power control means 30, a 12 volt DC power supply 60, an energy rays tracking means 80, a 6 volt DC power supply 120, a timed tracking means 160, an inclination adjustment means 81, actuators 248 and 249 and a mirror or lens cleaning means 250. FIG. 4 only shows the relay coils and contacts within individual means comprising the energy rays tracking device 27. Components within energy rays tracking device 27 and energy rays collector 28 are physically and functionally identical to the Second Preferred Embodiment except for additional features as hereinafter described.

The energy rays collectors whose positions are controlled by energy rays tracking device 27 contain a linear parabola shaped mirror which is rotated about an inclined shaft 240; and, with the inclination of said shaft being adjustable such that an imaginary line positioned perpendicular to and extending through the focal and vertex lines of said mirror will align with the direction of direct energy rays at noon during the entire year.

The change in inclination is accomplished by operation of an inclination adjustment means 81 which is identical to the bearing energy rays tracking means 81 in the First Preferred Embodiment. The inclination adjustment means obtains input from a second differential sensor 83 within receiving means 148. The neutral band of the second differential sensor and its associated slit is aligned perpendicular to the first differential sensor as described in the Second Preferred Embodiment. The inclination adjustment means 81 is only allowed to operate for a short period during noon each day by deactuation of contact 247. Deactuation of contact 247 connects the 6 volt DC power supply 120 with the inclination adjustment means 81 by actuation of contacts within actuator 249. The functioning of inclined adjustment means 81 for a short period at noon each day when direct energy rays are receivable will result in providing an acceptable year around inclination of shaft 240. The change in inclination is accomplished by a suitable jacking means 155 which will be controlled by the outputs 112 and 114 of the inclination adjustment means 81.

Components of each means of the energy rays tracking device whose internal actions are common knowledge to one knowledgeable in electronic circuits are described hereinafter by reference numbers shown in the individual figures for each means:

30-Power Control Means, Figure 8:

| | |
|---|---|
| 32-Photocell LDR 03 | 46-Resistor 3.9K |
| 36-Transistor NPN BC 148A | 47-Resistor 130 |
| 37-Transistor NPN BC 148 A | 48-Resistor 6.8K |
| 38-Transistor PNP AC 128 | 49-Resistor 3K |

-continued

| | |
|---|---|
| 40-Potentiometer 10K | 50-Resistor 620 |
| 42-Capacitor 470/40V | 51-Resistor 200 |
| 44-Resistor 2.4K | 54-Diode BAY 44 |
| 45-Resistor 2K | 56-Relay, 12 VDC, Four SPDT contacts |

60-12 Volt DC Power Supply, Figure 11

| | |
|---|---|
| 68-Transformer 220V Prm./12V Sec. | 76-Capacitor 0.1/20/250 |
| 70-Rectifier Assem. B80C 1000/1500 | 77-Capacitor 1000/40V |
| 74-Integrated circuit TDB 7812 | |

80 and 81 Energy Rays Tracking Means, Figure 7:

| | |
|---|---|
| 82-83 Differential sensor BPX 48 | 93-Transistor PNP BSV 15 |
| 90-Integrated circuit TAA 861 | 94-Transistor NPN BSX 45 |
| 91-Transistor NPN BCY 58 | 96-Potentiometer 10K |
| 92-Transistor PNP BCY 78 | 98-Capacitor 47 |
| 100-Resistor 10K | 108-Resistor 220 |
| 101-Resistor 10K | 109-Resistor 10K |
| 102-Resistor 1K | 110-Diode BAY 44 |
| 103-Resistor 1M | 111-Diode BAY 44 |
| 104-Resistor 1.5M | 112-Relay, 12VDC, One SPDT contact |
| 105-Resistor 220 | 114-Relay, 12VDC, One SPDT contact |
| 106-Resistor 10K | 116-Relay, 12VDC, One SPDT contact |
| 107-Resistor 220 | 118-Relay, 12VDC, One SPDT contact |

120 6 Volt DC Power Supply, Figure 12:

| | |
|---|---|
| 128-Transformer 220V Prim./12V Sec. | 144-145-Capacitor 0.1/160V |
| 130-137 Diode | 146-147-Capacitor 1000/16V |
| 140-141-Integrated Circuit TDB 7806 | |

160 and 161 Timed Tracking Means, Figure 9:

| | |
|---|---|
| 170-Transistor PNP BCY 70 | 185-187 Capacitor 1 |
| 171-Transistor PNP BCY 70 | 188-189 Capacitor 0.1 |
| 172-Transistor NPN BC 107 | 190-192 Resistor 1.2K |
| 173-Transistor NPN BSY 54 | 193 Resistor 510 |
| 174-Transistor NPN BSX 45 | 194 Resistor 5K |
| 176-177 I.C. Ferranti ZN1034E | 195 Resistor 10K |
| 180-Potentiometer 2.5M | 196 Resistor 5K |
| 181-182-Potentiometer 500K | 197 Resistor 10K |
| 184-Capacitor 100 | 198 Resistor 1.3K |
| 200-202 Diode BAY 44 | 204-205 Relay, 12VDC, One SPDT contact |

210-Acutator, Figure 2:

212-214 Relay, 12VDC, Three SPDT contacts.

250-Mirror or Lens Cleaning Means, Figure 10:

| | |
|---|---|
| 257-Transistor NPN BSX 45 | 280-Resistor 5K |
| 258-Transistor NPN BCY 59 | 281-Resistor 80 |
| 260-262 I.C. Ferranti ZN1034E | 282-Resistor 1.3K |
| 264-Potentiometer 50K | 283-Resistor 330 |
| 265-Potentiometer 500K | 284-Resistor 5K |
| 266-267-Potentiometer 1.3M | 285-Resistor 80 |
| 269-Trigger | 286-287-Resistor 10K |
| 270-Capacitor 3300 | 288-Resistor 5K |
| 271-Capacitor 10 | 289-Resistor 80 |
| 272-Capacitor 0.1 | 290-Resistor 160 |
| 273-274-Capacitor 1 | 291-Resistor 1.3K |
| 275-Capacitor 0.1 | 293-LED 2V,120ma |
| 276-Capacitor 1 | 294-Diode BAY 44 |
| 277-Capacitor 0.1 | 296-Relay, 12VDC, one SPDT Contact. |

Having described my invention, I claim:

1. An energy rays tracking device for automatic positioning control of a means for collecting energy rays having a geometric axis or plane, comprising:

a receiving means for receiving direct energy rays, said receiving means being rigidly attached to said energy rays collecting means;

a prime mover drivingly connected with said energy rays collecting means for maintaining alignment of direction of said geometric axis or plane with direction of said direct energy rays;

an energy rays tracking means responsive to said receiving means for automatically controlling power to the prime mover;

a timed tracking means responsive to said energy rays tracking means for controlling power to said prime mover for proximity tracking when said energy rays tracking means is not functioning due to energy rays being diffused, whereby said timed tracking means assures faster resumption of energy collection when direct energy rays again become receivable;

an energy rays sensitive element for automatically distinguishing when energy rays are substantially present or absent;

a power control means responsive to the energy rays sensitive element which automatically functions when energy rays are substantially absent to provide outputs which change over operations from an energy rays tracking sequence to a sequence whereby said energy rays collecting means is repositioned to be ready for the following period of tracking, wherein the presence of energy rays reverses the function of said power control means to initiate the following period of tracking.

2. The combination called for in claim 1 wherein said receiving means comprises:

an enclosure otherwise impervious to energy rays forming a means for allowing only a selected pattern of direct energy rays to penetrate into the enclosure; a razor sharp edge associated with the energy rays allowing means wherein the outermost direct energy rays within said selected pattern are maintained undiffused by contacting only the razor sharp edge which shapes said selected pattern, said enclosure being rigidly attached to the energy rays collecting means and positioned with the direction of the geometric axis or plane of said energy rays collecting means at a right angle to a plane containing said razor sharp edge;

a differential sensor sensitive to direct energy rays installed inside said enclosure such that said selected pattern of direct energy rays strikes the face of said differential sensor at a right angle and within a central neutral surface of said differential sensor only when directions of said direct energy rays and said geometric axis or plane are parallel and with said selected pattern of direct energy rays sweeping away from said central neutral surface onto an adjoining differential element surface of said differential sensor when said directions are not parallel as would occur periodically due to movement of said receiving means relative to direction of said direct energy rays, said differential element surfaces being sensitive to direct energy rays; and connections from said differential elements and said central neutral surface communicating with said energy rays tracking means whereby combined functioning of said energy rays tracking means with said receiving means causes said energy rays collecting means to be periodically repositioned relative to a base supporting said energy rays collecting means to maintain said directions parallel for maximum energy collection.

3. The combination called for in claim 2 wherein the energy rays tracking means comprises:

input connections connected with said receiving means;

input power conductors connected with the output of an external power supply;

means for using said input power wherein a signal through said input connections from said receiving means is processed to develop a particular output signal mode; and outputs whereby said output signal mode is utilized to control power supply to the prime mover.

4. The combination called for in claim 3 wherein the first of said outputs comprises a selector switch circuit whereby actuation of said selector switch causes said prime mover to move in a reverse direction when backtracking is called for by said energy rays receiving means, said backtracking being required when said timed tracking means advances the direction of the geometric axis or plane of said energy rays collecting means beyond direction of said direct energy rays prior to the time of said direct energy rays becoming receivable.

5. The combination called for in claim 3 wherein the second of said outputs comprises a selector switch circuit whereby actuation of said selector switch causes said prime mover to move in a forward direction when forward tracking is called for by said receiving means, said forward tracking being normal operating mode for direct energy rays tracking.

6. The combination called for in claim 4 wherein the timed tracking means comprises:

input signal conductors connected with outputs of said energy rays tracking means whereby operating mode of said outputs is sensed;

input power conductors connected with output of an external power supply;

a timed tracking section;

an automatic time delay switching section, input of which is connected with said input signal conductors and with said input power conductors, wherein said switching section prevents operation of time tracking section of said timed tracking means as long as said energy rays tracking means is functioning, and output of said switching section switches on timed tracking section when energy rays tracking means is not functioning indicating that energy rays are diffused, output of said switching section controlling input power supply to said timed tracking section, said timed tracking section functioning to provide output signals which are continuous cycling adjustable time periods with the first period controlling run time and with the second period controlling pause time of said prime mover; and an output whereby said output signals are utilized to control power supply to said prime mover.

7. The combination called for in claim 6 wherein said automatic time delay switching section within said timed tracking means comprises:

a first transistor responsive to the first output of said energy rays tracking means wherein actuation of said first output causes said first transistor to switch "OFF";

a second transistor responsive to the second output of said energy rays tracking means wherein actuation of said second output causes said second transistor to switch "OFF";

a time delay circuit;

a third transistor responsive to said time delay circuit wherein the power supply for said timed tracking means is switched "ON" or "OFF";

series connection of positive voltage through collector and emitter of first and second transistors through the time delay circuit to the base of the third transistor whereby said third transistor is switched "ON" to supply power to said timed tracking section only when time period between pulse actuations of said energy rays tracking means exceeds the time period setting of said time delay circuit, said pulses being generated with each actuation of said energy rays tracking means, said time delay circuit time period being adjustable in length and being controlled by said time delay circuit, said pulse actuations causing power interruptions to said time delay circuit and said third transistor base thereby reinitiating start of said time delay circuit time period at the end of each said pulse.

8. The combination called for in claim 6 further comprising:

a first relay actuator wherein elevation directional movement of said energy rays collecting means controlled by said timed tracking means is reversed when the apparent elevation movement of direct energy rays changes elevation direction at noon sun time, said first relay actuator installed functionally between the output of said timed tracking means and the input of prime mover providing elevation rotation of said energy rays collecting means, upon being energized causes reversal in direction of said prime mover;

an energy rays collecting means position sensing switch for energizing said first relay actuator when axis or plane of said energy rays collecting means aligns with the sun at noon sun time; and an auxiliary holding contact associated with said first relay actuator, through which said first relay actuator is maintained energized after said position sensing switch action is reversed;

wherein the power control means causes said first relay actuator to again become deenergized when energy rays are substantially absent.

9. The combination called for in claim 3 for use with a first power supply voltage and a second power supply voltage, wherein a first of said outputs and a second of said outputs of said energy rays tracking means comprise a first selector switch and a second selector switch respectively of the type having wiper connections and wherein the output of said timed tracking means includes a third selector switch, the first selector switch operates to select the first power supply voltage to the prime mover when said energy rays tracking means functions to backtrack when direct energy rays initially become receivable, and to select the second power supply voltage to said prime mover when said first output is deenergized; wherein the prime mover has a first power supply conductor which communicates with the wiper connection of said first selector switch and a second power supply conductor which communicates with the wiper connection of the third selector switch, said third selector switch operates to select the first power supply voltage to said prime mover during functioning of the timed tracking means when energy rays are diffused; wherein the common connection of said second selector switch communicates with said third selector switch wherein said third selector switch selects the wiper connection of the second selector switch when said time tracking means is deenergized and said second selector switch operates to select the first power supply voltage to said prime mover during functioning of said energy rays tracking means to forward track, said second selector switch selects the second power supply voltage to said prime mover when said second output is deenergized, and only one if any of said selector switches will be actuated at a time thereby causing said prime mover to operate since continuity of the power supply is completed through a deactuated selector switch.

10. The combination called for in claim 3 for use with a first potential power supply and a second potential power supply, wherein a first of said outputs and a second of said outputs of said energy rays tracking means comprise a first selector switch and a second selector switch respectively of the type having wiper connections, the first selector switch operates to select the first potential power supply to the prime mover when energy rays tracking means functions calling for backtracking when direct energy rays initially become receivable, said first selector switch selects the second potential power supply to said prime mover when said first output is deenergized; the second selector switch operates to select the first potential power supply to said prime mover when energy rays tracking means functions calling for forward tracking during time that direct energy rays are receivable, said second selector switch selects the second potential power supply to said prime mover when said second output is deenergized; and wherein the combination further comprises a prime mover having a first power supply conductor which communicates with the wiper connection of said first selector switch and a second power supply conductor which communicates with common connection of said second selector switch whereby power is interrupted or reversed to said prime mover as required during operating sequences, only one of said selector switches being actuated at any one time during the tracking sequence to connect its wiper connection to said first potential power supply thereby causing said prime mover to operate since said circuit is completed through the other unactuated selector switch to said second potential power supply.

11. The combination called for in claim 1 for use with an external power supply wherein the power control means comprises:

an externally mounted sensor, said sensor being sensitive to direct or diffused energy rays;

input power conductors connected with the output of the external power supply;

means using said input power for processing said input signal to develop a particular output signal mode; and outputs whereby said output signal mode is utilized to control multiple switching to change alternately from an energy rays tracking sequence to a repositioning and cleaning sequence for said energy rays using means.

12. The combination called for in claim 1 for use with an external power supply further comprising a means for cleaning the energy rays using means while it is being repositioned by the power control means, said cleaning means comprising:

a switch within said energy rays using means for sensing the position of the energy rays using means;

pumps and valves for controlling fluids sprayed on said energy rays using means;

input power conductors connected with the output of the external power supply, said power being controlled by the position sensing switch;

a total time section, an input of which communicates with said input power conductors whereby length of total time of cleaning sequence is adjustably controlled;

a cleaning time section, input of which communicates with output of said total time section functions to provide output signals which are continuously cycling adjustable time periods with first period controlling cleaning time and with the secon period controlling pause time; and an output whereby said output signals are utilized to control action of the pumps and valves.

* * * * *